No. 871,286. PATENTED NOV. 19, 1907.
J. W. MATOUSEK.
GRAIN SAVING DEVICE FOR PNEUMATIC STACKERS.
APPLICATION FILED JAN. 9, 1907.
2 SHEETS—SHEET 1.
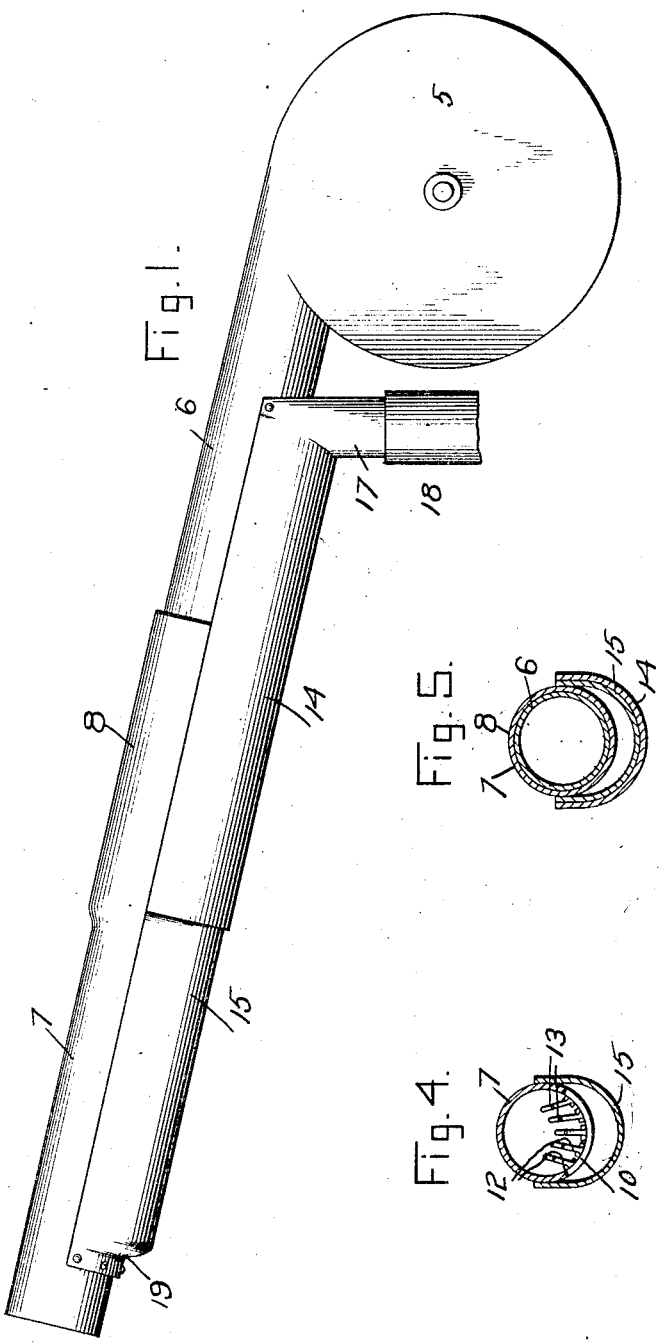

No. 871,286. PATENTED NOV. 19, 1907.
J. W. MATOUSEK.
GRAIN SAVING DEVICE FOR PNEUMATIC STACKERS.
APPLICATION FILED JAN. 9, 1907.
2 SHEETS—SHEET 2.
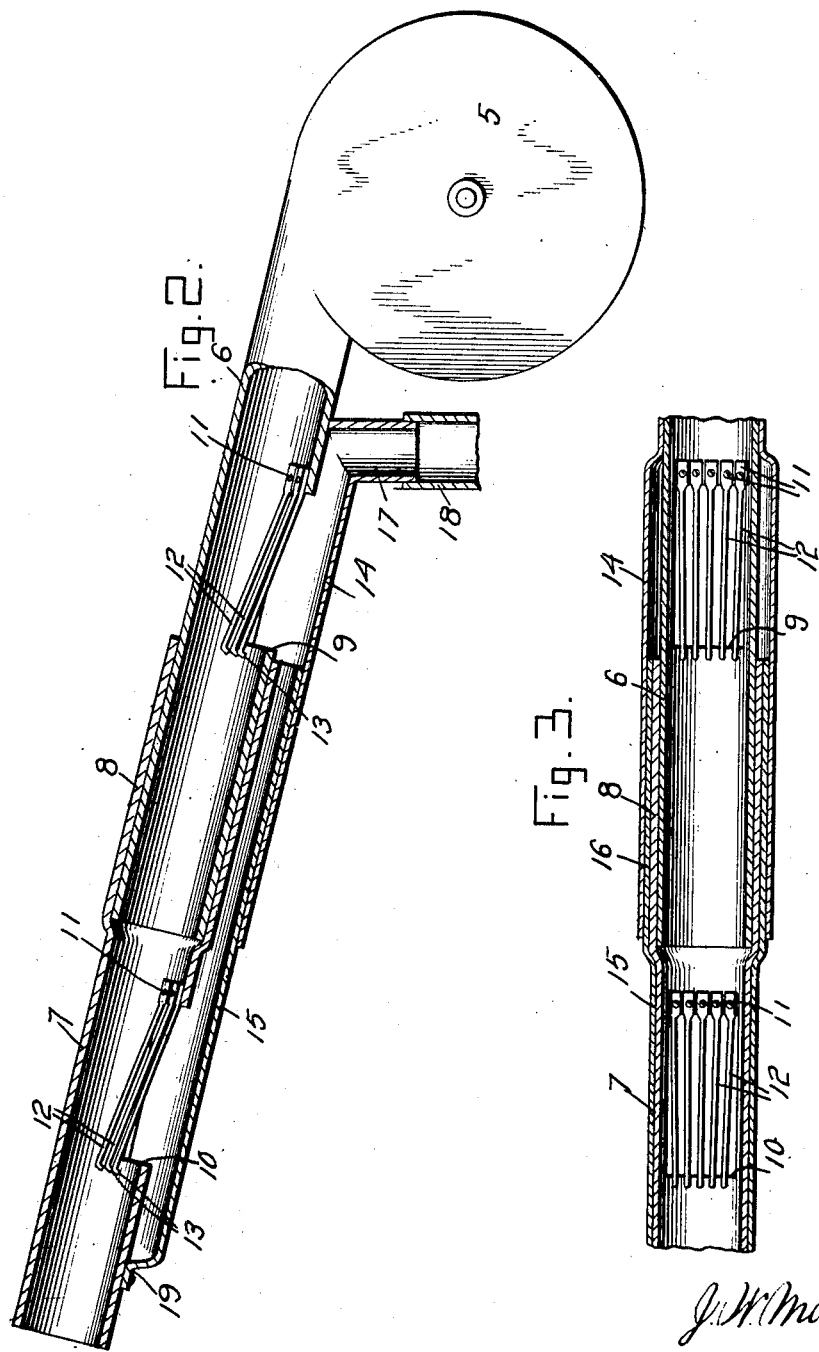

UNITED STATES PATENT OFFICE.

JOSEPH W. MATOUSEK, OF DRESDEN, KANSAS.

GRAIN-SAVING DEVICE FOR PNEUMATIC STACKERS.

No. 871,286.   Specification of Letters Patent.   Patented Nov. 19, 1907.

Application filed January 9, 1907. Serial No. 351,517.

*To all whom it may concern:*

Be it known that I, JOSEPH W. MATOUSEK, a citizen of the United States, residing at Dresden, in the county of Decatur, State of Kansas, have invented certain new and useful Improvements in Grain-Saving Devices for Pneumatic Stackers; and I do hereby declare the following to be a full, clear, and exact description of the invention, such as will enable others skilled in the art to which it appertains to make and use the same.

This invention relates to grain saving devices for pneumatic stackers, and more particularly to that class which consist in placing, in the stacker tube one or more screens through which loose grain may be screened from the straw passing through the tube and deposited in a suitable collecting trough arranged upon the under side of the tube.

My invention resides primarily in the provision of a novel form of screening element which, while it will effectually perform its function, will not clog the tube, a disadvantage found in most of the devices of this class now on the market. In carrying out my invention I form in the stacker tube one or more openings and secured within the tube and rearwardly of the openings, a number of upstanding fingers which project forwardly over the openings, it being understood that the straw is blown over these screens, thus formed, and that the grain which has accidentally been carried into the stacker tube by the straw, is screened and falls through the openings and into a trough arranged upon the under side of the tube, which trough leads to the return conveyer.

In the accompanying drawings: Figure 1 is a side elevation of the invention, Fig. 2 is a detail vertical longitudinal sectional view therethrough, Fig. 3 is a detail horizontal sectional view, Fig. 4 is a detail vertical transverse sectional view taken in a line with one of the openings through which the grain drops, and, Fig. 5 is a view similar to Fig. 4 but taken at a point where the stacker tube and the trough are telescoped.

Referring more specifically to the drawings, the numeral 5 denotes the fan casing of the stacker and 6 the stacker tube which leads from the fan casing. This stacker tube is preferably formed in sections which telescope and to this end one or more movable sections 7 are provided. While it is to be understood that any number of these sections may be employed, I only show one and illustrate this as being connected with the stacker tube proper 6. The section 7, at its end which is designed for connection with the fixed section 6, is enlarged as at 8 so as to telescopically receive the outer end of the said fixed section.

In the under side of the fixed section 6 there is formed an opening 9 and a similar opening 10 is formed in the under side of the movable section 7 and secured at their rear ends by riveting or otherwise as indicated at 11, to the inner side of the stacker tube sections and adjacent the rear edges of the openings 9 and 10 are fingers 12 which are bent adjacent their rear ends so as to extend slightly upwardly and forwardly above the openings and slightly beyond the forward edge thereof thus forming a grate over the openings. These fingers are formed of resilient metal and are to a slight degree yieldable so that passage of the straw over the fingers will not be interrupted thereby and to further avoid this interruption of the straw, the extreme forward ends of the fingers are curved downwardly as at 13. From the above described construction it will be observed that any loose grain which may have been carried by the straw into the stacker tube, will be screened by the fingers and will fall through the openings 9 and 10.

In order to collect the grain which is discharged through the openings in the stacker tube, as above described, I have provided a suitable trough which, as in the case of the stacker tube, is formed in telescopic sections, these sections being indicated by the numerals 14 and 15. The trough section 14 is secured at its upper edges to opposite sides of the fixed tube section 6 and the trough section 15 is secured in a similar manner to the movable tube section 7. The rear end portion of the trough section 15 is enlarged as at 16 to permit of the telescopic reception of the trough section 14, the upper edges of the enlarged portion of this trough section being free from the tube section 7 so that the telescopic movement of the sections may be readily accomplished.

At the extreme rear end of the trough section 14 there is formed a depending spout 17 with which is connected a pipe 18 which leads to the return elevator of the threshing machine (not shown). The forward end of the trough section 15 is bent upwardly as at 19 and secured to the tube section 7.

What is claimed is:—

A pneumatic stacker comprising a blower, a stacker tube leading from the blower and comprised of a pair of stacker tube sections, one of the said sections being fixed with respect to the blower, the other section being telescopically engaged over the outer end of the said fixed section, a trough section secured at its upper edges to opposite sides of the fixed section and thereby positioned beneath the said section, the forward portion of the said trough section being spaced at its upper edges with respect to the fixed stacker tube section to which it is secured, a trough section secured throughout the entire length of its upper edges to the movable stacker tube section and thereby positioned beneath the same, the trough section upon the fixed stacker tube section being open at its forward end, a spout leading from the said trough section at its rear end, the forward end of the trough section upon the movable stacker tube section being closed and the said trough section being telescopically received in the trough section upon the fixed stacker tube section, the two tube sections being provided each with an opening, and fingers secured at their ends within the tube adjacent the rear edges of the corresponding openings, said fingers being extended forwardly in an inclined plane above the said respective openings and having their forward ends turned downwardly.

In testimony whereof, I affix my signature, in presence of two witnesses.

JOSEPH W. MATOUSEK.

Witnesses:
J. H. ERNEST,
A. SNECKENBURGER